United States Patent [19]
Ogawa et al.

[11] Patent Number: 5,472,458
[45] Date of Patent: Dec. 5, 1995

[54] ARTIFICIAL SOIL STRUCTURE AND A METHOD OF PREVENTING LAND DESERTIFICATION USING THE SAME

[75] Inventors: Kinya Ogawa, Kawasaki; Yoichi Hirasawa, Higashikurume; Takao Oshima, Kubiki; Yoshiaki Nishimura, Tokyo, all of Japan

[73] Assignee: Shin-Etsu Chemical Co., Ltd., Tokyo, Japan

[21] Appl. No.: 103,043

[22] Filed: Jul. 28, 1993

[30] Foreign Application Priority Data

| Jul. 31, 1992 | [JP] | Japan | 4-257534 |
| Aug. 21, 1992 | [JP] | Japan | 4-245788 |
| Oct. 7, 1992 | [JP] | Japan | 4-296338 |

[51] Int. Cl.$^6$ .................................. A01G 23/095
[52] U.S. Cl. ................ 47/1.01; 47/DIG. 10; 47/66; 405/263
[58] Field of Search .................. 47/1 F, 66 S, DIG. 10; 405/263

[56] References Cited

U.S. PATENT DOCUMENTS

| 3,274,730 | 9/1966 | Bose | 47/1 F |
| 3,710,510 | 1/1973 | Tully | 47/DIG. 10 |
| 4,004,368 | 1/1977 | Tully | 47/DIG. 10 |
| 4,027,428 | 6/1977 | Hillel | 47/DIG. 10 |
| 4,462,184 | 7/1984 | Cunningham | 47/1 F |
| 4,986,699 | 1/1991 | Bonhoff | 404/36 |

FOREIGN PATENT DOCUMENTS

| 475489 | 3/1992 | European Pat. Off. | 47/1 F |
| 2635639 | 3/1990 | France | 47/1 F |
| 3260213 | 11/1991 | Japan | 47/1 F |
| 5690 | 4/1992 | WIPO | 47/66 S |

*Primary Examiner*—Henry E. Raduazo
*Attorney, Agent, or Firm*—Townsend & Banta

[57] ABSTRACT

An artificial soil structure includes at least one hydrophobic layer of hydrophobic particles provided in a soil. A particle size of the hydrophobic particles can be 2000 micrometers and less. The hydrophobic particles are sand and/or dirt treated with a water-repellent agent or hydrophobic particles having a high molecular weight polymer. An artificial water-retentive soil structure includes a soil block containing a water-retentive agent and a hydrophobic layer of hydrophobic particles provided on the soil block. A method of preventing land desertification includes the steps of placing a hydrophobic layer of hydrophobic particles in a soil at a prescribed depth from the earth surface and controlling the water content in said soil.

15 Claims, 8 Drawing Sheets

5,472,458

ARTIFICIAL SOIL STRUCTURE AND A METHOD OF PREVENTING LAND DESERTIFICATION USING THE SAME

FIELD OF THE INVENTION

This invention relates to a newly improved artificial soil structure and a method of preventing land desertification (land turning to desert) using the same, and more specifically to an artificial soil structure which is capable of controlling water evaporation from soil and a method of preventing land desertification using the same.

This invention can be effectively used particularly in environmental protection applications such as land desertification prevention, desert afforestation and forest protection, and in various types of industrial fields such as agriculture and horticulture, and also for use in such applications as the foundation ground of structures for public engineering works and building construction.

BACKGROUND OF THE INVENTION

Recently, as symbolized by the 1992 Earth Environmental Summit, worldwide attention has been focused on the earth's environmental problems, and how to protect the earth's environment has become a worldwide problem for industrial technology.

For example, approximately 30% of the world's land area is currently occupied by deserts, and this area continues to increase. While there are various causes for this, many of them are environmentally destructive factors associated with the production activity of human beings, such as overlogging of trees, environmental pollution including acid rain, massive pumping of underground water, and abnormal weather conditions which are believed to be caused by the destruction of the ozone layer and an increase in the production of carbon dioxide gas. At the same time, the world population continues to increase every year.

In order to prevent food shortages associated with this population growth, it is necessary to revive the soil which is dead as a result of desertification, as well as to prevent future desertification of the soil.

Conventionally, methods have been carried out which increase the water content of the soil by building canals for irrigation and artificially precipitating rain. However, these methods are not a fundamental improvement in the soil structure, and the supplied water soon seeps out, resulting in a poor efficiency of water use. Therefore, in order to efficiently prevent desertification, it is necessary to improve the soil structure itself.

For the purpose of avoiding food shortages, there have been efforts to improve the crops themselves using biotechnology techniques to increase productivity. Yet in order to increase the productivity of crops, it is necessary to improve the soil in which crops grow such that the soil is suitable for each crop. However, although soil improvements such as plowing the soil surface or adding fertilizers have been routinely carried out, there have not been attempts to artificially build layers in the soil for the purpose of fundamentally improving the soil environment based on the soil structure, i.e. fundamentally improving the structure of the soil itself.

Furthermore, in modern societies, partly because of population growth, numerous structures have been built, by various public engineering works, building construction, etc. For these structures, needless to say, the foundation ground plays a very important role, and to maintain a stable foundation ground for many years it is necessary to fundamentally improve the environmental characteristics of the soil at the ground level so that they are suitable for the structures.

As described above, the improvement of soil structure is becoming necessary in order to make the environmental characteristics of the soil desirable for human beings in a total planetary environment. The environmental characteristics of soil are often determined by the water content of the soil. Therefore, it is of primary importance to improve the soil structure in such a way that the water content of the soil can be artificially controlled.

Conventionally, means to control the water content of soil have been proposed, for example, a mixture of soil and a water-retentive polymer compounds(s), and surface treatment of the soil with polymer hydrogen siloxane as described in the Japanese unexamined patent publication (Tokkai) Hei 1-319585.

Although the methods described above are expected to have an effect as means of controlling the water content in soil, it must be said that their effect still falls short of preventing land desertification, and more effective methods have been sought.

SUMMARY OF THE INVENTION

Accordingly, it is an object of this invention to provide an artificial soil structure which solves the problems described above in environmental protection applications such as land desertification prevention, desert afforestation and forest protection, and in various types of industrial fields such as agriculture and horticulture, and also for use in fields such as the foundation ground of structures for public engineering works and building construction.

It is another object of this invention to provide an artificial water-retentive soil structure which solves the problems described above by artificially improving the soil structure itself, not only for use in industries such as various kinds of agriculture and horticulture but also in the environmental protection applications such as soil desertification prevention, desert afforestation and forest protection.

It is a further object of this invention to provide a method of afforestation and revival of land which is dead due to desertification, as well as effectively preventing future land desertification.

According to one embodiment of the invention, an artificial soil structure having one or more hydrophobic layers consisting essentially of hydrophobic particles in the soil is provided.

The particle size of the hydrophobic particles may be 2000 micrometers or less. The hydrophobic particles may be sand and/or dirt treated with a water-repellent agent. The hydrophobic particles may consist of a high molecular polymer. The water-repellent agent may be a silicone or fluoro water-repellent agent.

The soil layer, which contacts from above the hydrophobic layer consisting essentially of hydrophobic particles, may be a water-retentive layer which is substantially comprised of water retentive material. A water-retentive layer(s) which has water retentivity may be provided between the hydrophobic layers and the surface of the soil. Two or more hydrophobic layers consisting substantially of hydrophobic particles in the soil may be provided in such a way that the hydrophobic layers are not in contact with each other. Two or more hydrophobic layers consisting essentially of hydrophobic particles in the soil may have at least two different types of hydrophobicities. Further, at least two hydrophobic layers with different hydrophobicities, out of two or more hydrophobic layers consisting substantially of hydrophobic particles in the soil, may be provided in such a way that they are in contact with the other.

The artificial soil structure may have a nonwoven fabric on the hydrophobic layer consisting essentially of hydrophobic particles in the soil.

According to another embodiment of the invention, an artificial water-retentive soil structure contains a hydrophobic layer of hydrophobic particles on top of soil containing a water-retentive agent.

The artificial water-retentive soil structure has a hydrophobic layer of hydrophobic particles over soil which contains water-retentive agent, and a soil layer which does not contain a water-retentive agent at the interface. The artificial water-retentive soil structure may have a soil layer without a water-retentive agent on top of the hydrophobic layer of hydrophobic particles. The artificial water-retentive soil structure may have a water-retentive layer of soil particles containing a water-retentive agent, provided above the hydrophobic layer.

The artificial water-retentive soil structure may have non-hydrophobic soil portions within the hydrophobic layer or penetrating the hydrophobic layer. The water-retentive agent may be a water-retentive high molecular weight compound. The particle size of the hydrophobic particles may be 2000 micrometers or less. The hydrophobic particles may be sand and/or dirt treated with a water-repellent agent. The water-repellent agent may be a silicone or fluoro carbon water-repellent agent.

According to a further embodiment of this invention, a method is provided of preventing land desertification which includes placing a hydrophobic layer of hydrophobic particles in soil at a prescribed depth from the earth surface, and controlling the water content in the soil.

The water-retentive layer containing a fine soil or a water-retentive agent may be placed in the soil at a prescribed depth from the earth's surface, the depth being above said hydrophobic layer. The particle size of said hydrophobic particles may be 2000 micrometers or less. The hydrophobic particles may be sand and/or dirt treated with a water-repellent agent. The water-repellent agent may be a silicone or fluoro water-repellent agent(s). The water-retentive agent may be a water-retentive high molecular weight compound.

This invention suppresses water evaporation from the target soil at a desired rate by using different factors such as different types of the hydrophobic particles, different thickness, of the hydrophobic layer, combinations of the multiple hydrophobic layers, permutations and combinations with other layers such as the water-retentive layer, and combinations with the external environment factors, thus designing the water content of the soil structure for a desired land, and allowing a new useful method to control soil environment.

DETAILED DESCRIPTION OF THE INVENTION

This invention will be described in detail below. For the hydrophobic particles to form the hydrophobic layers, anything which has hydrophobic characteristics and is in particle form may be used. The material may be either inorganic or organic. The concept "hydrophobicity" includes so-called "water repellency".

In this invention, at least one hydrophobic layer of hydrophobic particles must be included in the soil structure which constitutes the soil. A "soil structure" is a structure of soil consisting of at least two types of layers including at least one hydrophobic layer of hydrophobic particles, i.e. a soil block having a 3-dimensional structure. It is sufficient if the hydrophobic layers are substantially composed of hydrophobic particles, and it is within the scope of this invention if particles with other characteristics are mixed in, as long as the hydrophobic characteristic of the layer as a whole is not lost. For example, depending on the application, it is effective to provide a hydrophobic layer with decreased hydrophobicity in limited areas such as where plants are to be planted on the soil surface. Furthermore, depending on the application and while remaining within the range where the hydrophobicity of the hydrophobic layer as a whole is not lost, particles with other useful characteristics can be mixed into soil with the hydrophobic particles which comprise the hydrophobic layer.

The particle system of the hydrophobic particles in this invention has no specific limitation as long as it is within the range which can accomplish the purposes of this invention. A particle system with an average particle size of 2000 micrometers or less is preferable for ease of controlling water content. A more preferable size is 1000 micrometers or less.

For the hydrophobic particles in this invention, sand and/or dirt particles with their particle surfaces treated with water-repellent agent are preferred. They can be used individually or mixed together. More preferable is water-repellent sand which is sand treated with a water-repellent agent. As for the water-repellent agent used, there is no specific limitation as long as it is generally used as a water-repellent agent. More preferable is a silicone type or a fluoro type water-repellent agent. Particularly preferable is a fluoro type because of its long stability in performance if it is used in a severe condition. Furthermore, a water-repellent agent consisting of a mixture of silicone type and fluoro type can be used.

For the silicone water-repellent agent, a silicone compound represented by the following general formula (1) is an example, it can be used directly (without solvents) or it can be used after dilution in solvents such as toluene, xylene or trichlorethylene, or it can be used in an emulsion form. Also, hardening catalysts such as dibutyl tin dilaurate, dibutyl tin diacetate, dioctyl tin laurate or iron octate can be used.

$$R^1{}_aR^2{}_bSiO_x \qquad (1)$$

$R^1$ is a homo or hetero unsubstituted or substituted monovalenthydrocarbon groups;

$R^2$ is a homo or hetero groups selected from hydrolyzable groups, —OH and —H;

a and b are numbers defined as $0 \leq a < 4$, $0 \leq b \leq 4$ and $0 < a+b \leq 4$;

$x=(4-a-b)/2$.

For example, in the general formula (1), $R^1$ is a group made by replacing all or part of the hydrogen atoms bonded to carbon atoms with halogen atoms or cyano groups in groups including alkyl groups with a carbon number of 1–15, such as methyl, ethyl, propyl and decyl groups, alkenyl groups such as vinyl and allyl groups, aryl groups such as phenyl groups, cyclo alkyl groups.

$R^2$ can be hydrolyzable groups such as alkoxy groups, acyloxygroups, ketoxime groups, amino groups, aminoxy groups, amide groups, enoxy groups and alkenyloxy groups, halogen groups such as chlorine, $-OR^3$ ($R^3$ is Na or K), —OH or —H.

For example of actual silicone compounds, the following compounds represented by (2) through (5), or their partially hydrolyzed products or their co-hydrolyzed products, can be used.

$$HO-Si(ONa)(CH_3)-[OSi(ONa)CH_3]_n-OH \quad (n: 0, 1, 2) \tag{2}$$

$$CH_3-[SiO(CH_3)_2]_m-[SiO(H)(CH_3)]_l-Si(CH_3)_3 \quad (l, m: 0 \text{ or integer}) \tag{3}$$

$$R^4-[SiO(CH_3)_2]_k-Si(CH_3)_2R^4 \quad (k: \text{integer}, R^4: -OH, -CH=CH_2, OCH_3) \tag{4}$$

$$CH_3SiCl_3, C_{10}H_{21}SiCl_3, CF_3CH_2CH_2SiCl_3, CH_3Si(OCH_3)_3, CF_3CH_2CH_2Si(OCH_3)_3 \tag{5}$$

A silazane compound represented by formula (6)

$$(CH_3)_3SiNH-Si(CH_3)_3 \tag{6}$$

is also useful as a water-repellent agent for use in this invention.

For the fluoro water-repellent agent, fluoro compounds represented by the following general formula (7), (10) to (19) and (22) are examples. It can be used after dilution in solvents, or it can be used in an emulsion form, if necessary. In the formulas, l, m and n represent integers.

X stands for H or $CH_3$. Y stands for either (8) or (9):

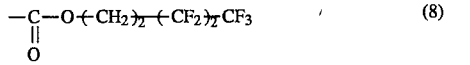

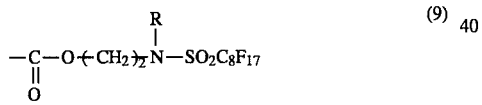

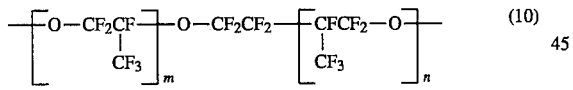

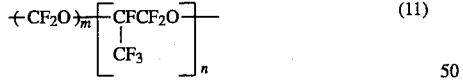

$$+CF_2CF_2CF_2O+_n \tag{12}$$

$$+CF_2CF_2+_n \tag{13}$$

$$+CF_2CFCl+_n \tag{14}$$

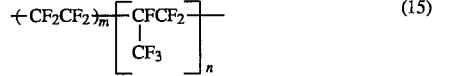

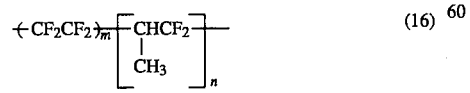

$$+CF_2CH_2+_n \tag{17}$$

$$+CHFCH_2+_n \tag{18}$$

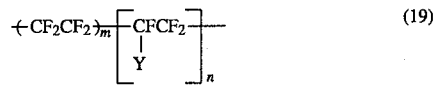

Y stands for $-OCF_3$ or either (20) or (21):

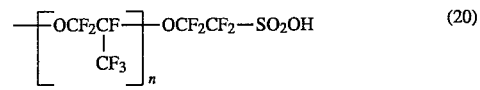

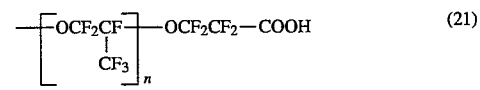

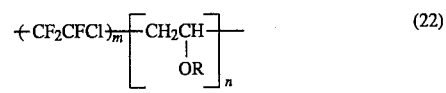

R stands for a cyclohexyl group or a butyl group.

As a fluoro type water-repellent agent, one modified by organosilane or organopolysiloxane may be useful, and particularly, one denaturated by organosilane or organopolysiloxane including a hydrolyzable group, OH group or h may be useful for obtaining long life water-repellency.

An example of such silane compounds is a fluorosilicone shown below as formula (23).

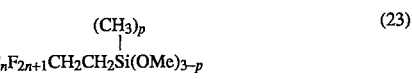

[n is an integer of 6 to 8; p is any of 0, 1, or 2; and Me stands for $CH_3$]

An example of a compound represented by the formula (23) is a silane compound shown below as formulas (24) or (25).

$$C_8F_{17}CH_2CH_2Si(OMe)_2 \overset{Me}{|} \tag{24}$$

$$C_8F_{17}CH_2CH_2Si(OMe)_3 \tag{25}$$

Another example of a fluoro water-repellency agent is a co-polymer with other silanes such as $RSi(OMe)_3$, $R_2Si(OMe)_2$ or $H.RSi(OMe)_2$ (R is an alkyl group having 1 to 12 carbons) as well as a perfluoroacrylate. Expeically, a co-polymer with an alkylsilane having a long chain is preferable.

Further example is a co-polymer of:

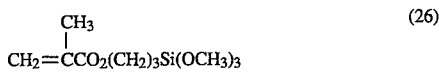

and

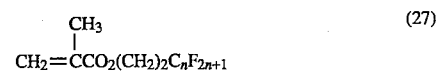

n is an integer.

For the method of surface treatment of sand or dirt particles with a water-repellent agent, it is sufficient to follow methods usually employed in the surface treatment of fine particles. For example, it is possible to mix various silicone oils with sand using mechanochemical methods, thus performing surface treatment to produce hydrophobic particles.

For the hydrophobic particles, in addition to water-repellent sand as described above, fine particles of high molecular weight polymers (plastics) whose surfaces are hydrophobic can be used. In particular, organosilicone types are preferable, and polymethyl silsequioxane is even more preferable. Also, for example, it is possible to use waste plastic crushed into a particle form, thus effectively using waste plastic to help solve the waste plastic disposal problem. It is also possible to give a water-repellent treatment to these high molecular polymers before using.

In addition to the hydrophobic particles described above, hydrophobic particles including hydrophobic particulate metal oxides such as silica, alumina, titania, zirconia, vanadium oxide and iron oxide, crushed products of glass beads and oil shale, and oil sand can be used. These are more preferable when their surfaces have been treated with a silicone or fluoro water-repellent agent. However, oil shale and oil sand can be used effectively without silicone treatment.

In this invention, it is required that at least one hydrophobic layer as described above be included in the artificial soil structure, and two or more hydrophobic layers may be used if necessary. With multiple hydrophobic layers, all layers may have the same hydrophobicity, or layers with different hydrophobicities are also possible. They can be in contact with each other, or there can also be a soil layer which is not a hydrophobic layer of hydrophobic particles as an interface.

The hydrophobicity of the hydrophobic layer can be controlled at will by, for example, changing the type of hydrophobic particles and/or the thickness of the hydrophobic layer. That is, the hydrophobic layers of hydrophobic particles in soil of this invention can be selected as necessary in terms of the type, size and shape of the hydrophobic particles constituting the layer, the depth from the soil surface, the water control factor, etc. For example, it is possible to adjust the level of hydrophobicity by properly mixing water-repellent sand, which consists of hydrophobic particles, and common sand not treated with a water-repellent agent, which consists of non-hydrophobic particles.

Furthermore, in one aspect of this invention, it is also useful to provide a water-retentive layer which has water-retentivity in the soil over the hydrophobic layer of hydrophobic particles or to provide a layer which has water-retentivity between the hydrophobic layer and the soil surface. This water-retentive layer can be obtained by adding fine particle soil to any water-retentive agent to the soil. Any water-retentive agent can be used, as long as the effective water content of the soil is increased by adding the agent.

Examples of water-retentive polymers are PVA (polyvinyl alcohol), MC (methyl cellulose) and CMC (carboxymethyl cellulose), acrylic high molecular weight water-absorbent polymers, peat moss, inorganic perlite, montmorillonite and vermiculite.

One embodiment of this invention is an artificial water-retentive soil structure made of soil containing a water-retentive agent with a hydrophobic layer on top of it. Here, "on top of" means "over the layer which contains the water-retentive agent", in other words, there is a hydrophobic layer of hydrophobic particles on the upper side, i.e. in the direction of the earth's surface.

For example, when the artificial water-retentive soil structure embodiment of this invention is used in planting applications, sometimes it is effective to remove the hydrophobicity in limited areas where the plants are on the soil surface. The actual means for this includes planting seedlings grown in paper pots.

One aspect of this invention can also be an artificial water-retentive soil structure which has a hydrophobic layer or hydrophobic particles on top of soil containing a water-retentive agent, with a soil layer without a water-retentive agent at the interface. This is an aspect of the artificial water-retentive soil structure where the soil layer with a water-retentive agent is not in contact with the hydrophobic layer above it (in the direction of the soil's surface).

Such aspects of this invention are determined according to each application. For example, when growing plants on the artificial water-retentive soil structure of this invention, the optimum soil structure suitable for the characteristics of individual plants within the scope of this invention may be adopted.

Also, in this invention it is preferable in terms of water retention and practicality for the water-retentive agent to be a high molecular weight compound with water retentivity. The high molecular weight compound can either be a natural polymer or a synthetic polymer. As for the polymer used, a polymer resistant to enzymes such as cellulase is preferable. Also, one which produces toxic substance by decomposition is not preferable. One which does not destroy the soil environment is preferable. Base on these considerations, cellulose derivatives, gumsand, PVA, acrylic acid type absorption polymers etc., are preferable. In particular, when this invention is used in very dry desert areas and such, it is preferable to use an artificial water-retentive soil structure which contains a so-called water absorbent polymer which has good water retentivity and can absorb water more than several hundred times heavier than its own weight.

Placing an additional soil layer on top of the hydrophobic layer of the artificial water-retentive soil structure of this invention has advantages in that it prevents the loss of the hydrophobic particles caused by wind and such, and also prevents degradation by sunlight and such, thus giving superior durability to the hydrophobic particles constituting the hydrophobic layer.

One embodiment is an artificial water-retentive soil structure which has a soil layer without a water-retentive agent on top of the hydrophobic layer. For example, by placing a 5–500 mm thick soil layer of sand or dirt on top of a hydrophobic layer, the hydrophobic layer will be protected from degradation by sunlight and/or scattering by wind and, therefore, use of this embodiment of this invention in areas with strong sunlight and/or wind will ensure that the effect lasts for a long period of time without degradation.

Also, the artificial soil structure with nonwoven fabric on top of the hydrophobic layer has the advantage that a reduction in hydrophobicity of the hydrophobic layer due to the incorporation of nonhydrophobic particles from the layer over the hydrophobic layer does not occur.

Manufacturing the structure comprising the artificial soil structure (which also means the artificial water-retentive soil structure) of this invention can be done, for example, by digging earth of a prescribed area to a prescribed depth, and then artificially embedding the artificial soil structure, as described above, in the area of earth, thus artificially forming a layered structure which has one or more hydrophobic layers substantially comprising hydrophobic particles in the soil. Embedding the artificial soil structure can be done by embedding the hydrophobic layer of hydrophobic particles of any thickness in place of an existing layer(s). The layers composing the rest of the soil can be left, for example, similar to the surrounding natural layers, or it is also possible to embed the water-retentive layer described above to complete the artificial soil structure. The thickness of the hydrophobic layers is determined according to the application.

It is sufficient to dig earth of a prescribed area to a prescribed depth, and then embed a hydrophobic layer of any thickness of hydrophobic particles on top of it. The layers which constitute the rest of the soil can be, for example, similar to the surrounding natural layers.

In order to embed the hydrophobic layer of any thickness of hydrophobic particles, it is sufficient to lay down the hydrophobic particles at the worksite. As a concrete example, sand and a water-repellent agent can be mixed at the worksite by using a mixer-agitator similar to a concrete mixer trucks from the water-repellent plant and conduct the water-repellent treatment of the sand as the truck drives towards the worksite. It is also possible to fill cubic containers or bags with sand treated with a water-repellent agent in the plant, and then lay them down one by one in the dug area. Emulsion spray method can be used to produce the hydrophobic particles with a water-repellent agent.

This method allows accurate and easy configuration of the thickness of the hydrophobic layers. By filling containers with other soil constituting layers such as water-retentive particles and fertilizers and laying them down, the desired artificial soil structure of any extent (area) can easily be obtained.

There is no particular limitation on the size of the artificial soil structure, and any target area and thickness can be set depending on the application. It is possible to fill large containers of a prescribed height with the complete artificial soil structure including the hydrophobic layer of this invention in the plant, and then simply lay them in a prescribed dug up area which has a depth which is the same as the height of said containers. Also, this invention allows a design of the soil structure of this invention which omits the earth digging process and lays the artificial soil structure of this invention on a finite area of land to artificially form a new layer structure with a substantially hydrophobic layer on the earth surface. It is also possible, if necessary, to enclose a certain area of land made of the artificial soil structure with a dome and form a special growing environment suitable for crops which is a combination of artificial soil structure and an external environment having an artificial atmosphere.

This invention as described above can suppress water evaporation from the target soil at any rate by using different factors such as the types of the water-retentive agent and the hydrophobic particles, the characteristic of the soil, the thickness of the soil layer containing the water-retentive agent and the thickness of the hydrophobic layer and various combinations with the external environment, thus controlling the water content of the soil structure, and allowing a new useful method to control soil water content.

In this invention, the hydrophobic layer of hydrophobic particles described above is provided in the soil. This has the advantage that, when compared with the case where the hydrophobic layer is provided on the soil surface, the hydrophobic particles comprising the hydrophobic layer are more durable because they are protected in the soil. Furthermore, since the hydrophobic particles in the soil prevents the loss of the hydrophobic particles due to wind, this embodiment has the advantages of stability of the hydrophobic layer itself which composes the soil structure, and the ability to make the hydrophobic layer in the soil structure thinner, as loss of hydrophobic particles can be prevented.

BRIEF DESCRIPTION OF THE DRAWINGS

This invention will be explained in more detail in conjunction with appended drawings.

DESCRIPTION OF THE PREFERRED EMBODIMENT

[Artificial Soil Structure]

Figure 1:
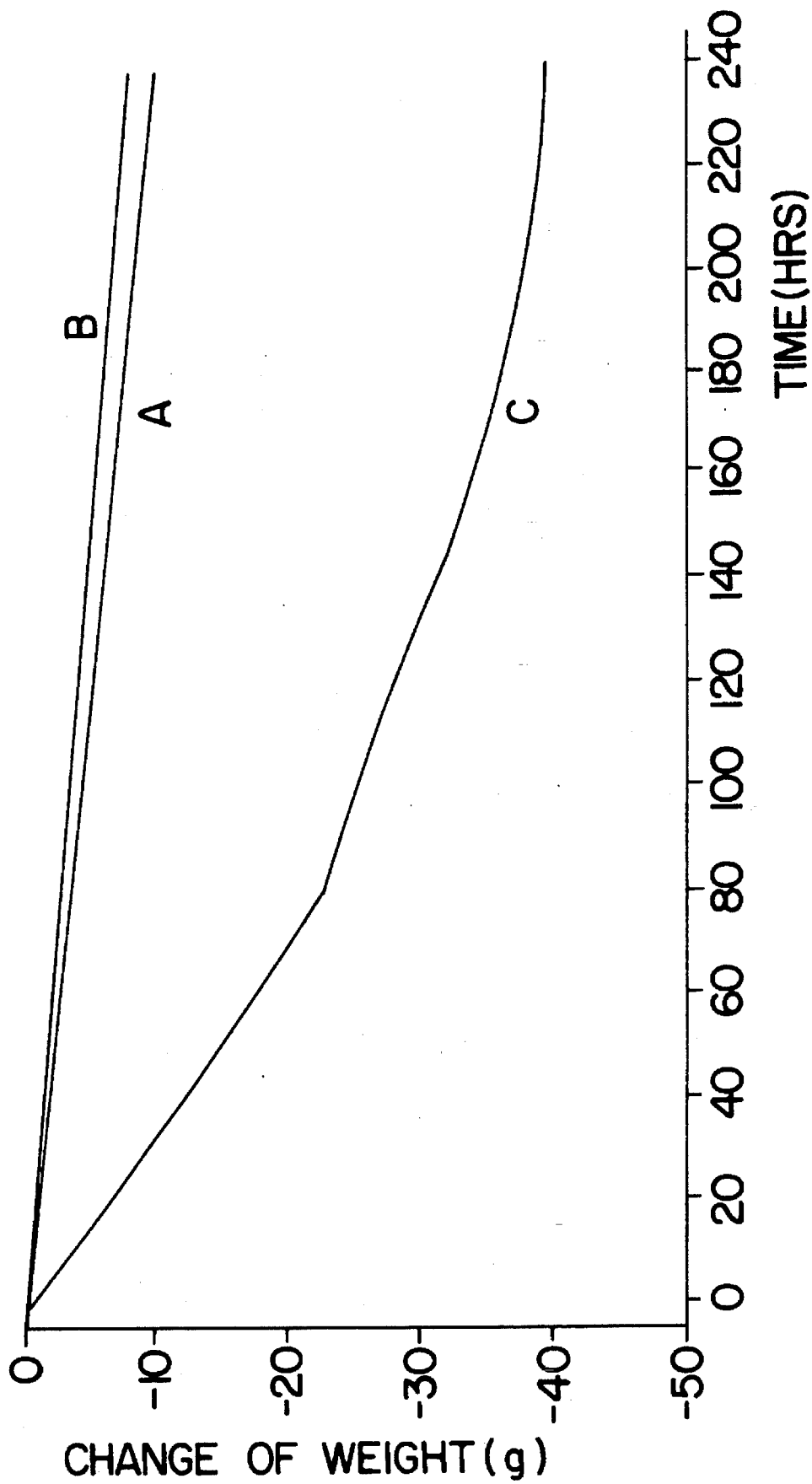
FIG. 1 is a graph showing the progress of water evaporation for Example 1, Example 2 and Comparative Example 1.

In an artificial soil structure, a layer consisting essentially of hydrophobic particles is below the good surface, i.e. below the top surface of the soil. In this location, the hydrophobic layer is not exposed to the influence of wind and sunlight and is thus protected. In a preferred embodiment, the hydrophobic layer is located in the soil above the ground-water level but below or even above the roots of plants. In another preferred embodiment of the artificial soil structure, the hydrophobic layer can be between about 5 to 100 cm below the soil's surface. When the hydrophobic layer is located below the roots of plants its depth is preferably 40–80 cm below the soil's surface. When the hydrophobic layer is located even or above roots of plants its depth is preferably 5 to 40 cm below the soil's surface. The depth of the hydrophobic layer is measured from the top of the hydrophobic layer to the top surface of the soil.

In another preferred embodiment, the thickness of the hydrophobic layer can be at least about 3 to 5 times the diameter of the average hydrophobic particles in the hydrophobic layer. In yet another preferred embodiment, the thickness of the hydrophobic layer is from about 1 to 5 cm, more preferably 2 to 4 cm.

According to one aspect of the present invention, a water-retentive agent or layer can optionally be used in the artificial soil structure containing the hydrophobic layer. Some types of soil retain water. If the soil contains a high proportion of sand, i.e. sandy soil, thus water retentive, it is preferable to have a water-retentive agent in a layer above the hydrophobic layer. When water is applied to the surface of the soil, some of the water will be retained in the soil above the hydrophobic layer, because the hydrophobic layer slows passage or drainage of water through the soil. This embodiment is preferred for large plant cultivation, in particular with a large amount of pot cultivation for use in a huge desert or vast bleak plain.

When the root of the plant is above the hydrophobic layer, it is better for the layer even with the root to have water-retentivity, for example, by using fine soil or a water-retentive agent.

When a pot holding a plant penetrates the hydrophobic layer, the water provided from the ground surface goes through the pot and below the hydrophobic layer. As a result, the water under the hydrophobic layer will not readily go up to the surface through the hydrophobic layer and vaporize. Thus, water is supplied continuously to the roots of the plant.

[Artificial Water-retentive Soil Structure]

In a preferred embodiment of the artificial water-retentive soil structure, a hydrophobic layer is located from about 5 to 50 cm, more preferably from about 10 to 20 cm below the surface of the soil. The thickness of the hydrophobic layer can be from about 3 to 5 times of the average hydrophobic particle size in the hydrophobic layer.

In another preferred embodiment, the thickness of the hydrophobic layer is from about 1 to 5 cm, more preferably from about 2 to 4 cm. Thus, in the soil structure of the present invention, the root of a plant on the surface can reach through the hydrophobic layer to the water-retentive layer. This embodiment is most preferably used for large amount of pot cultivation in deserts or dry fields, etc. The pots penetrate the hydrophobic layer so that the roots of a plant in the pot can reach the water-retentive layer. Water provided from the surface can soak through the pot and also easily reach the water-retentive layer. The pot can be a paper pot or plastic pot with penetrating holes on the side and the bottom. The water-retentive layer can contain a water-retentive agent, for example peat moss or fine soil, etc. The second hydrophobic layer can optionally be located below the water-retentive layer. Thus, large pot cultivation can be conducted.

The above described embodiment of an artificial soil structure and an artificial water-retentive soil structure can preferably be used in a method of preventing land desertification.

EXAMPLES

Next, this invention will be described by referring to examples. However, this invention is not limited to those examples.

[EXAMPLE 1]

2.5 kg of 0.3% $C_{10}H_{21}Si(Cl)_3$ n-hexane solution was poured onto 10 kg of Asano quartz sand No. 4 (average particle size approximately 1000 micrometers) and also onto 10 kg of Asano quartz sand No. 7 (average particle size approximately 100 micrometers). After agitation they stood for approximately 12 hours at room temperature. Then, after filtering and water rinsing, they were dried at 100° C. to obtain silicone treated hydrophobic quartz sand.

A 3.3 cm deep layer of Asano quartz sand No. 4 was placed in each of 3 glass containers with 10 cm diameter and 10 cm depth. 43 g of water was poured over them to prepare wet layers. For Example 1, a 3.3 cm layer of the silicone treated sand Asano quartz sand No. 4 was provided on top of the wet layer of one of these three containers, and then a 2 cm layer of Asano quartz sand No. 4 was added on top of it to prepare a laboratory scale artificial soil structure to confirm the effects of this invention. This was named "Sample A".

[EXAMPLE 2]

Using the silicone treated Asano quartz sand No. 7 instead of the silicone treated Asano quartz sand No. 4 used in Example 1, a 3.3 cm hydrophobic layer was provided in the same manner as for the silicone treated sand Asano quartz sand No. 4 was added on top of it. This artificial soil structure was named "Sample B".

[Comparative Example 1]

Asano quartz sand No. 4 without silicone treatment, instead of the silicone treated Asano quartz sand of Examples 1 and 2, was laid to provide a 5.3 cm Asano quartz sand layer without a hydrophobic layer. This artificial soil structure was named "Sample C".

Samples A, B and C of Examples 1 and 2 and Comparative Example 1, respectively, stood at a room temperature of 30° C., and the weight change (water evaporation) of each of them were measured. The measurement results are shown in a graph in FIG. 1. This graph indicates that the artificial soil structures of the Examples, compared with the artificial soil structure of the Comparative Example, suppressed and controlled water evaporation to a greater degree.

[EXAMPLE 3]

An artificial soil structure was prepared in the same manner as for Example 1, except that polymethyl silsesquioxane (particle size 800 micrometers), a granular hydrolyzed product of $CH_3SiCl_3$, was used instead of the silicone treated sand, and the weight change was measured in exactly the same manner as for Example 1. This artificial soil structure was named "Sample D".

[EXAMPLE 4]

An artificial soil structure was prepared in the same manner as for Example 1, except that polymethyl silsesquioxane (particle size 100 micrometers), a granular hydrolyzed product of $CH_3SiCl_3$, was used instead of the silicone treated sand, and the weight change was measured in the exactly same manner as for Example 1. This artificial soil structure was named "Sample E".

[Comparative Example 2]

Asano quartz sand No. 7 without silicone treatment, instead of the silicone treated Asano quartz sand of Examples 3 and 4, was laid to provide a 5.3 cm Asano quartz sand layer without a hydrophobic layer. This artificial soil structure was named "Sample F".

Figure 2:
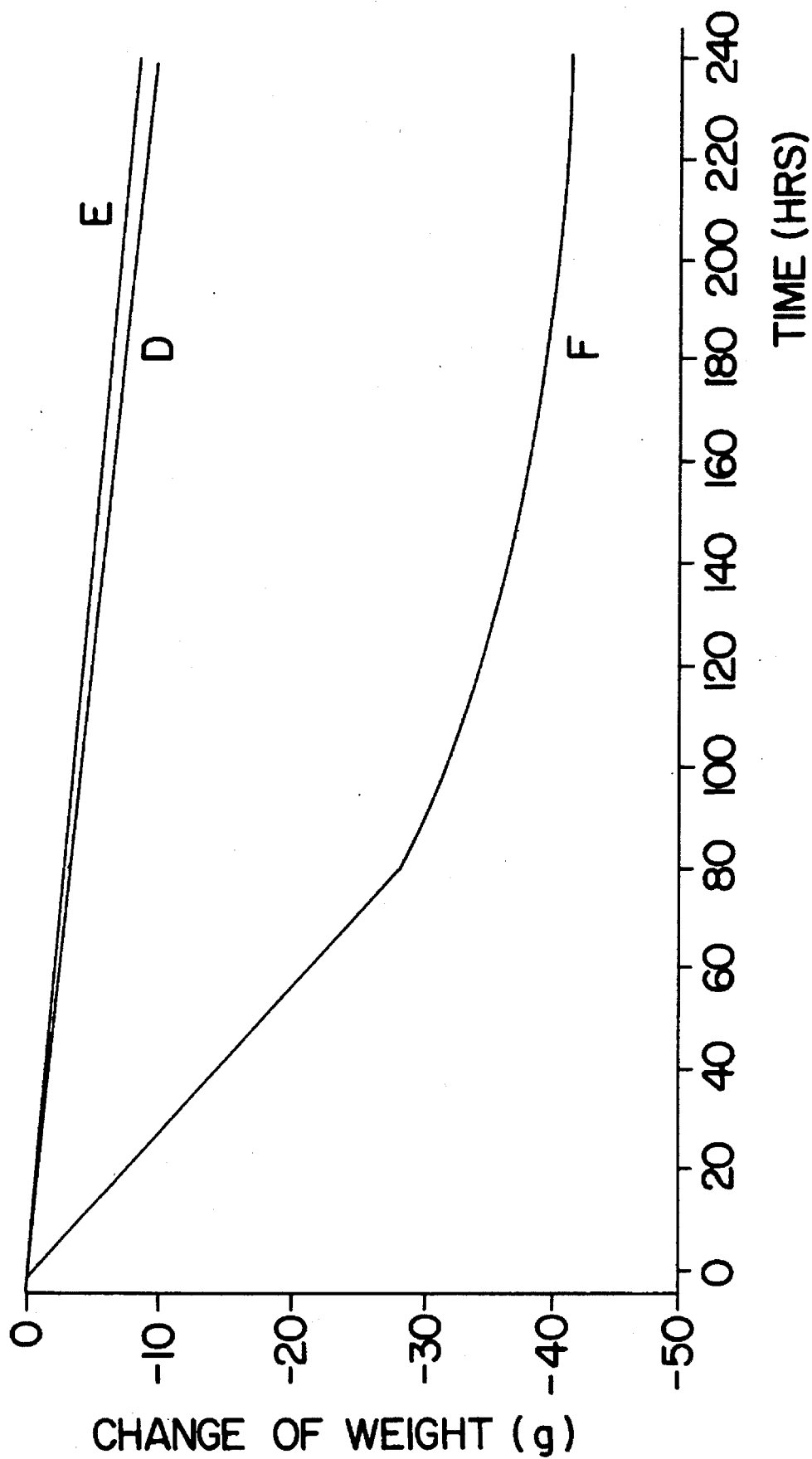
FIG. 2 is a graph showing the progress of water evaporation for Example 3, Example 4 and Comparative Example 2.

The weight change (water evaporation) measurement results for each Example, along with the measurement for Comparative Example 2, is shown in a graph in FIG. 2. This graph indicates that the artificial soil structures of Examples 3 and 4, compared with the artificial soil structure of the Comparative Example, suppress and control water evaporation to a greater degree.

[EXAMPLE 5]

Figure 3:
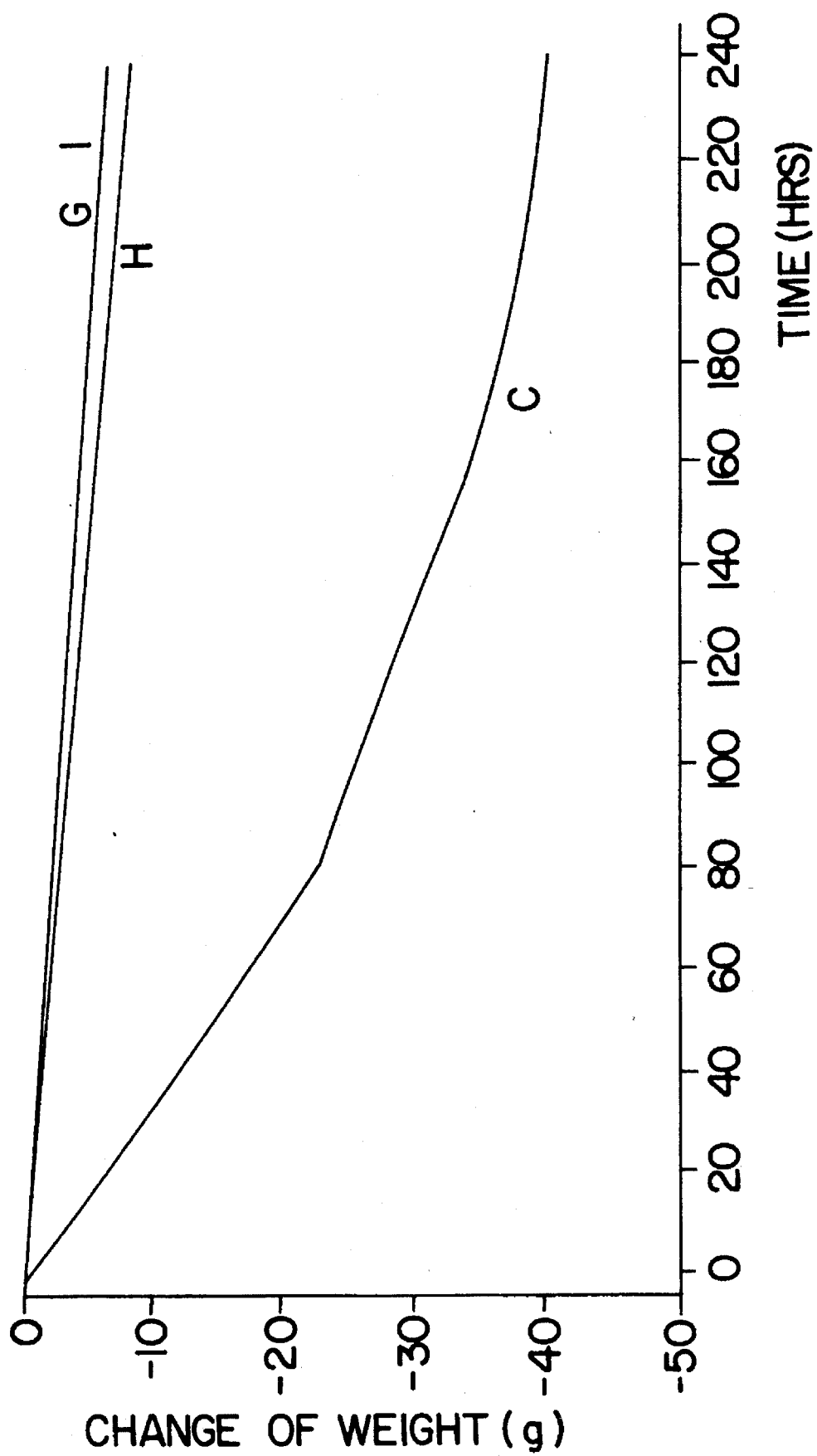
FIG. 3 is a graph showing the progress of water evaporation for Example 5 and Comparative Example 1.

An artificial soil structure was prepared in the same manner as for Example 1, except that, a) a 0.5% xylene solution of $HO—Si(ONa)(CH_3)—[OSi(ONa)CH_3]_n—OH$ (mixture of n: 0, 1 and 2), b) a 0.5% xylene solution of $(CH_3)_3SiNH—Si(CH_3)_3$, and c) a 0.5% xylene solution of a partially hydrolyzed product of $CH_3Si(OCH_3)_3$ (product name KC-89 from Shin-Etsu Chemical Co., Ltd.), were used. Samples from a), b) and c) were named G, H and l, respectively, and stood at a room temperature of 30° C., and the weight change (water evaporation) of each of them was measured. The measurement results are shown in a graph in FIG. 3. This graph indicates that the results for G and l were almost the same, and that the artificial soil structures of both of these Examples, compared with the artificial soil structure of Comparative Example C, suppressed and controlled water evaporation to a greater degree.

[EXAMPLE 6]

A silicone type water-repellent agent (product name Polon-MR from Shin-Etsu Chemical Co., Ltd.) and a fluoro type water-repellent agent (product name AG710 from ASAHI GLASS Co., Ltd.) were prepared.

1 kg of of quartz sand No. 7 was poured into a mortar mixer of 5 liter, and 80 g of a water-repellent liquid which includes 2.5% in solid state of either at the above silicone type of fluoro type water-repellent agent was dropped in the quartz sand, then the quartz sand was dried for 2 hours at 150° C. Then, water-repellent sand which includes 0.2% of the water-repellent agent based on the quartz sand was obtained.

Next, 40 g of water was poured on quartz sand No. 4 to prepare wet layers, and then 75 g and 150 g of the water-repellent sand of silicone type or fluoro type on the wet layers to prepare soil structures. The soil structures were aged in a warm air circulating drier at 40° C. After being aged, changes in the amount of water evaporation from the soil structures were measured and the amount of water transportation were compared to each other. The results are shown in Table 1.

TABLE 1

| WATER-RETENTIVE SAND | AMOUNT OF THE SAND | CHANGE IN AMOUNT OF EVAPORATING WATER | | | |
|---|---|---|---|---|---|
| | | 0 HR | 48 HR | 70 HR | 110 HR |
| SILICON TYPE WATER-REPELLENT SAND | 75 g | 0 | −8.2 | −12.0 | −18.9 |
| | 150 g | 0 | −4.5 | −6.6 | −10.3 |
| FLUORO TYPE WATER-REPELLENT SAND | 75 g | 0 | −8.3 | −12.1 | −19.0 |
| | 150 g | 0 | −4.6 | −6.7 | −10.6 |

As understood by Table 1, there was no difference between the silicone type water-repellent sand and the fluoro type water-repellent sand in the amount of evaporating water passing through the water-repellent sand layers, and the same effect can be obtained from the two water-repellent sands.

[EXAMPLE 7]

The silicone type and fluoro type water-repellent sands which were obtained in Example 6 were soaked with a standard liquid of pH4, pH7 or pH10, and aged for long hours at 50° C. water-repellent ability of these sands were measured to analyze life time thereof. The results are shown in Table 2. In Table 2, A to E indicate the following:

A: having water-repellent ability in 60% methanol
B: having water-repellent ability in 40% methanol
C: having water-repellent ability in 20% methanol
D: having water-repellent ability in water
E: having no water-repellent ability in water

TABLE 2

| WATER-RETENTIVE SAND | pH | CHANGE OF WATER-REPELLENT ABILITY | | |
|---|---|---|---|---|
| | | 160 HR | 500 HR | 1000 HR |
| SILICON TYPE WATER-REPELLENT SAND | 4 | C | D | D |
| | 7 | A | A | B |
| | 10 | D | E | E |
| FLUORO TYPE WATER-REPELLENT SAND | 4 | A | A | A |
| | 7 | A | A | A |
| | 10 | A | A | A |

As understood by Table 2, the water-repellent sand using the fluoro type water-repellent agent had an advantage in long life water-repellent ability as compared with the water-repellent sand using the silicone type water-repellent agent, except in neutral.

The above examples demonstrate that the artificial soil structure of this invention is capable of controlling the water content in soil, and that, when increased in scale, it is capable of improving the soil structure at a total environmental level.

EXAMPLE 8]

2.0 wt % of the water-retentive agent Acryhope (from Nippon Shokubai Kagaku Kogyo Co., Ltd.), which had high molecular sodium acrylate as the major ingredient, was thoroughly mixed with Asano quartz sand No. 4 (average particle size 1000 micrometers) to obtain soil containing the water-retentive agent. Then, 2.5 kg of 0.3% $C_{10}H_{21}Si(Cl)_3$/n-hexane solution was poured on to 10 kg of Asano quartz sand No. 4 (average particle size 1000 micrometers) and also onto 10 kg of Asano quartz sand No. 7 (average particle size 100 micrometers). After agitation they stood for approximately 12 hours at room temperature. Then, after filtering and water rinsing, they were dried at 100° C. to obtain silicone treated hydrophobic quartz sand which consisted of hydrophobic particles.

A 10 cm layer of the soil containing the water-retentive agent described above was put into a 10 cm diameter, 30 cm deep glass container, a 3.3 layer of the silicone treated Asano quartz sand No. 4 obtained above was laid on top of this water-retentive agent containing layer, and then a 2 cm layer of Asano quartz sand No. 4 was laid on top of that, and thus a laboratory scale artificial water-retentive soil structure was built to confirm the effects of this invention.

[EXAMPLE 9]

2.0 wt % of the water-retentive agent Acryhope (from Nippon Shokubai Kagaku Kogyo Co., Ltd.), which had high molecular sodium acrylate as the major ingredient, was thoroughly mixed with Asano quartz sand No. 7 (average particle size 100 micrometers) to obtain soil containing the water-retentive agent. Then, 2.5 kg of 0.3% $C_{10}H_2Si(Cl)_3$/n-hexane solution was poured onto 10 kg of Asano quartz sand No. 4 (average particle size 1000 micrometers) and also onto 10 kg of Asano quartz sand No. 7 (average particle size 100 micrometers). After agitation they stood for approximately 12 hours at room temperature. Then, after filtering and water rinsing, they are dried at 100° C. to obtain silicone treated hydrophobic quartz sand which consisted of hydrophobic particles.

A 10 cm layer of the soil containing the water-retentive agent described above was put into a 10 cm diameter, 30 cm deep glass container, a 3.3 cm layer of the silicone treated Asano quartz sand No. 7 obtained above was laid on top of this water-retentive agent containing layer, and then a 2 cm layer of Asano quartz sand No. 7 was laid on top of that, and thus a laboratory scale artificial water-retentive soil structure was built to confirm the effects of this invention.

[Comparative Example 3]

An artificial water-retentive soil structure was prepared by using Asano quartz sand No. 4 which had not been treated with silicone, in place of the silicone treated Asano quartz sand of Examples 8 and 9.

50 cc of distilled water was poured into the water-retentive layer in each of Example 8, Example 9 and Comparative example 3. the water was held in each water-retentive agent containing soil layer. They stood at room temperature of 35° C. and their change in weight was measured. The results showed that the artificial water-retentive soil structures of the examples of this invention suppressed water evaporation more than the artificial water-retentive soil structure of comparative example.

[EXAMPLE 10]

3.0 wt % of the water-retentive agent Acryhope (from Nippon Shokubai Kagaku Kogyo Co., Ltd.), which had high molecular sodium acrylate as the major ingredient, was thoroughly mixed with Asano quartz sand No. 4 (average particle size 1000 micrometers) to obtain soil containing the water-retentive agent. Then, polymethylsyl sesquioxane (particle size 800 micrometers), a granular hydrolyzed product of $CH_3SiCl_3$, was used as the hydrophobic particles comprising the hydrophobic layer.

A 10 cm layer of the soil containing the water-retentive agent described above was put into a 10 cm diameter, 30 cm deep glass container, a 3.3 cm layer of the Asano quartz sand No. 4 was laid on top of this water-retentive agent containing layer, and then a 2 cm layer of the hydrophobic layer of polymethylsyl sesquioxane was laid on top of that, and then finally a 2 cm layer of Asano quartz sand No. 7 was laid on top of that, and thus a laboratory scale artificial water-retentive soil structure was built to confirm the effects of this embodiment of the invention.

[EXAMPLE 11]

5.0 wt % of the water-retentive agent Acryhope (from Nippon Shokubai Kagaku Kogyo Co., Ltd.), which had high molecular sodium acrylate as the major ingredient, was thoroughly mixed with Asano quartz sand No. 7 (average particle size 100 micrometers) to obtain soil containing the water-retentive agent.

Then, polymethylsyl sesquioxane (particle size 800 micrometers), a granular hydrolyzed product of $CH_3SiCl_3$, was used as the hydrophobic particles comprising the hydrophobic layer.

A 10 cm layer of the soil containing the water-retentive agent described above was put into a 10 cm diameter, 30 cm deep glass container, a 3.3 cm layer of the Asano quartz sand No. 7 was laid on top of this water-retentive agent containing layer, then a 2 cm layer of the hydrophobic layer of polymethylsyl sesquioxane was laid on top of them, and then finally a 3.3 cm layer of Asano quartz sand No. 7 was laid on top of that, and thus a laboratory scale artificial water-retentive soil structure was built to confirm the effects of this embodiment of the invention.

[EXAMPLE 12]

2.0 wt % of the water-retentive agent Acryhope (from Nippon Shokubai Kagaku Kogyo Co., Ltd.), which had high molecular sodium acrylate as the major ingredient, was thoroughly mixed with Asano quartz sand No. 4 (average particle size 1000 micrometers) to obtain soil containing the water-retentive agent. Then, 2.5 kg of 0.3% HO—Si(ONa)(CH$_3$)—[OSi(ONa)CH$_3$]—OH/n-hexanesolution was poured onto 10 kg of Asano quartz sand No. 4 (average particle size 1000 micrometers) and also onto 10 kg of Asano quartz sand No. 7 (average particle size 100 micrometers). After agitation they stood for approximately 12 hours at room temperature. Then, after filtering and water rinsing, they were dried at 100° C. to obtain silicone treated hydrophobic quartz sand which consists of hydrophobic particles.

A 10 cm layer of the soil containing the water-retentive agent described above was put into a 10 cm diameter, 30 cm deep glass container, a 3.3 cm layer of the silicone treated Asano quartz sand No. 4 obtained above was laid on top of this water-retentive agent containing layer, and then a 2 cm layer of Asano quartz sand No. 4 was laid on top of that, and thus a laboratory scale artificial water-retentive soil structure was built to confirm the effects of this invention.

[Comparative Example 4]

An artificial water-retentive soil structure was prepared by using Asano quartz sand No. 7, in place of the hydrophobic layer for Examples 11 and 12 which was made of polymethylsyl sesquioxane.

100 cc of distilled water was poured into Example 10, Example 11, Example 12 and Comparative Example 4, and was held in each water-retentive agent containing soil layer. Then, they stood at room temperature of 38° C., and their change in weight (amount of water evaporated) was measured. The results show that the artificial water-retentive soil structures of the examples of this invention suppressed water evaporation more than the artificial water-retentive soil structure of the comparative example.

The examples described above demonstrate that the artificial water-retentive structure of this invention, compared with the artificial water-retentive soil structure prepared by mixing a water-retentive agent with the soil, provided much better control of water evaporation from the soil. If this is increased in scale to a total environmental level, it will be possible to improve the soil structure, in dry regions such as deserts, so that the water retentivity of the soil is maintained for a long period of time, and the soil structure becomes suitable for the growth of crops.

[EXAMPLE 13]

A 10 cm layer of Asano quartz sand No. 4 was put into a polystyrene foam pot. A 10 cm layer of the water-retentive agent containing soil of Example 8 was laid on top of it, and then a 3 cm layer of the hydrophobic layer of Example 8 was laid on top of that. On top of these, a 2 cm layer of Asano quartz sand No. 4 was laid. In this, a cotton seedling was raised in a 10 cm diameter, 10 cm deep paper pot filled with alluvial soil. This paper pot for the cotton seedling was laid in such a way that the bottom of the paper pot reached the water-retentive agent containing soil layer. With 40 g/m² of water sprinkled every week and the temperature at 35° C., the cotton grew satisfactorily. As a comparative example, a cotton seedling in a paper pot raises in the same way and under the same conditions as Example 13, except that a 3 cm layer of Asano quartz sand was laid in place of said hydrophobic layer, did not grow.

[EXAMPLE 14]

136 g of No. 7 sand was put into a 200 ml beaker to lay an approximately 30 mm thick sand layer. Water was poured onto this until the water reached the upper surface of the sand. 136 g of water-repellent sand which consisted of No. 7 sand treated with 0.05% of the silicone compound KL3103 (from Shin-Etsu Chemical Co., Ltd.) was laid on top of this water containing sand. Then, still on top of this, 136 g of No. 7 sand was laid to form a 3-layer soil structure. After this beaker stood at 38° C. for 20 hours, and the average water evaporation per hour was 0.033 g/hour.

[Comparative Example 5]

A soil structure was formed under the same conditions as for Example 14, except that untreated No. 7 sand was used instead of said water-repellent sand, and stood under the same conditions as for Example 14. As a result, after standing for 20 hours, the average water evaporation per hour was 0.54 g/hour.

As shown above, the soil structure of Example 14 showed 1/10 or less of the water evaporation of Comparative Example 5, indicating remarkable suppression of water evaporation from the soil.

[EXAMPLE 15]

Figure 4:
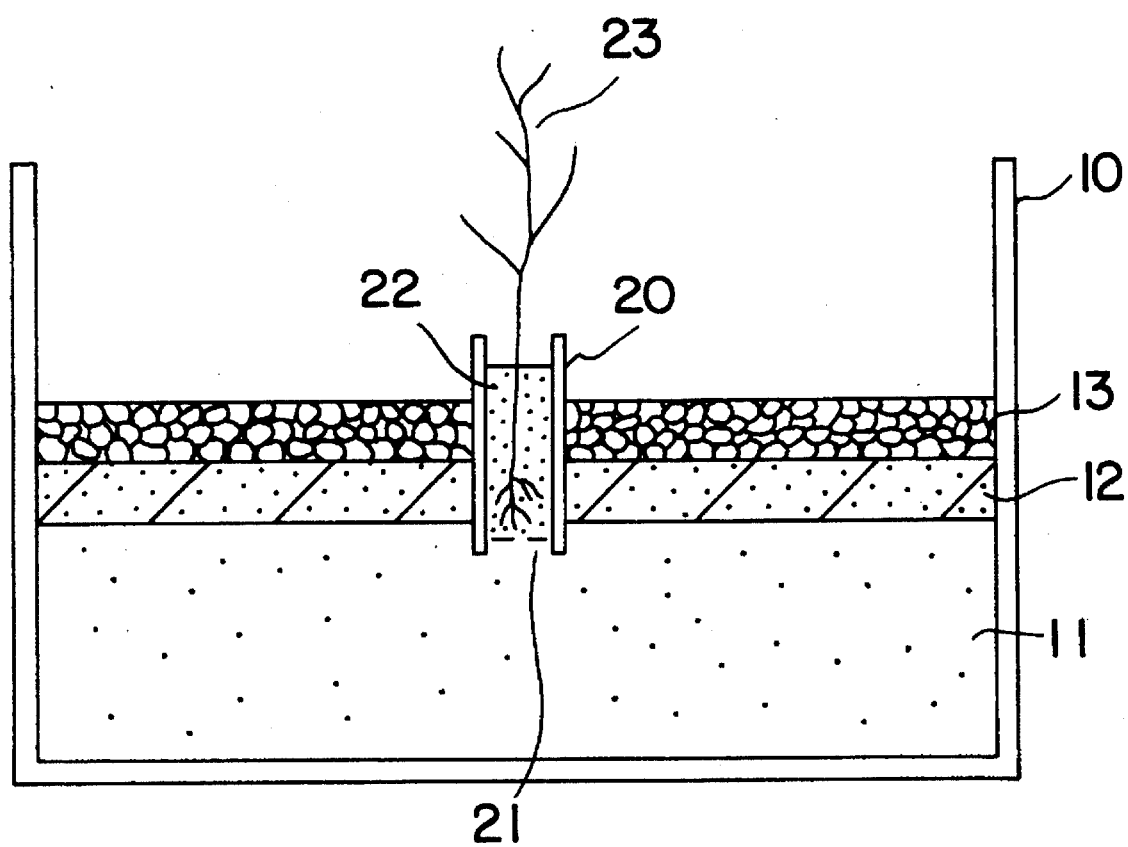
FIG. 4 is a drawing explaining a method for a tomato seedling growth experiment to confirm the effects of Example 15.

As shown in FIG. 4, humus was laid in a 500 mm deep polystyrene foam pot 10 to form the 200 mm humus layer 11. On top of this, No. 4 sand treated with the same water-repellent agent as for Example 14 was laid to form the 50 mm thick water-repellent layer 12, and then again on top of this, untreated sand was laid to form the 50 mm sand layer 13, thus a 3-layer soil structure was formed. The soil 22 was laid in the 50 mm diameter plastic pot 20 which had the metal screen 21 at the bottom and in a portion of the sides, and the tomato seedling 23 was planted in this soil. This tomato seedling 23 in the plastic pot was planted in such a way that the metal screen 21 reached 10 mm deep into the humus layer 11. Then, the temperature was kept at 30° C. and 2 l/m² of water was sprinkled from above once a week.

[Comparative Example 6]

A 3-layer soil structure was formed under the same conditions as for Example 15 except that untreated common sand was used instead of said water-repellent sand, and a tomato seedling was planted in the same manner as for Example 15 to conduct the experiment.

The tomato seedling of Comparative Example 6 died of water insufficiency, but the seedling of Example 15 was still growing satisfactorily after 50 days. Therefore, it was confirmed that soil structures like Example 15 were very effective for afforestation of land.

Figure 5:
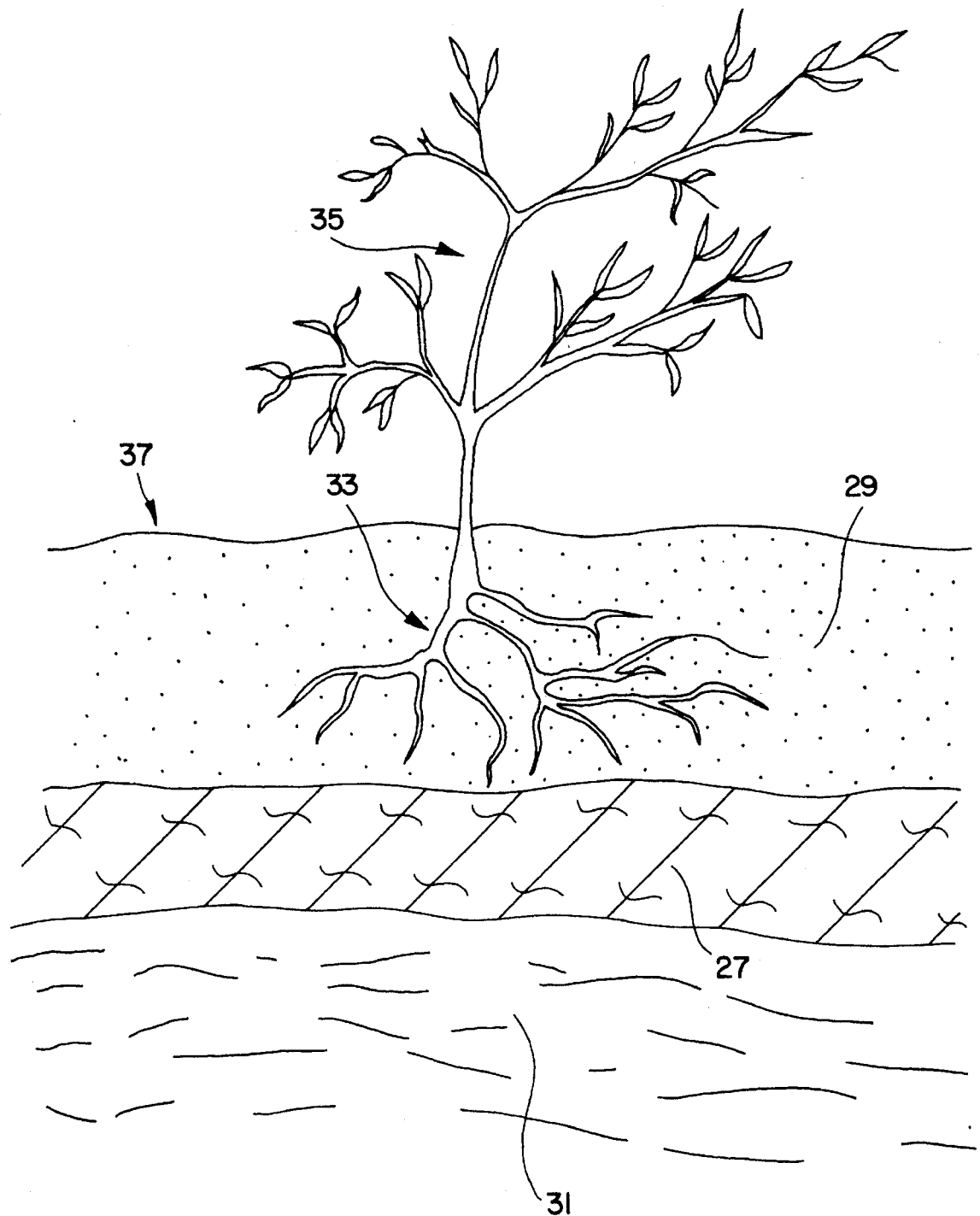
FIG. 5 is a cross-sectional view of an Artificial soil structure showing the position of a sand layer relative to ground water level and roots of a plant.

FIG. 5 shows and Artificial soil structure 25 in which a soil layer 27 treated with a fluoro-type water-repellant agent is positioned in the soil below a top soil layer 29, and above the ground-water level 31 but below roots 33 of plant 35. In the embodiment shown in FIG. 5, the sand layer 27 is located from about 40–80 cm below a top surface 37 of topsoil layer 29. Preferably, the average size of sand particles in said layer 27 is from about 2,000 micrometers (2 mm) or less, and said layer 27 has a thickness or depth of from 1–5 cm.

Figure 6:
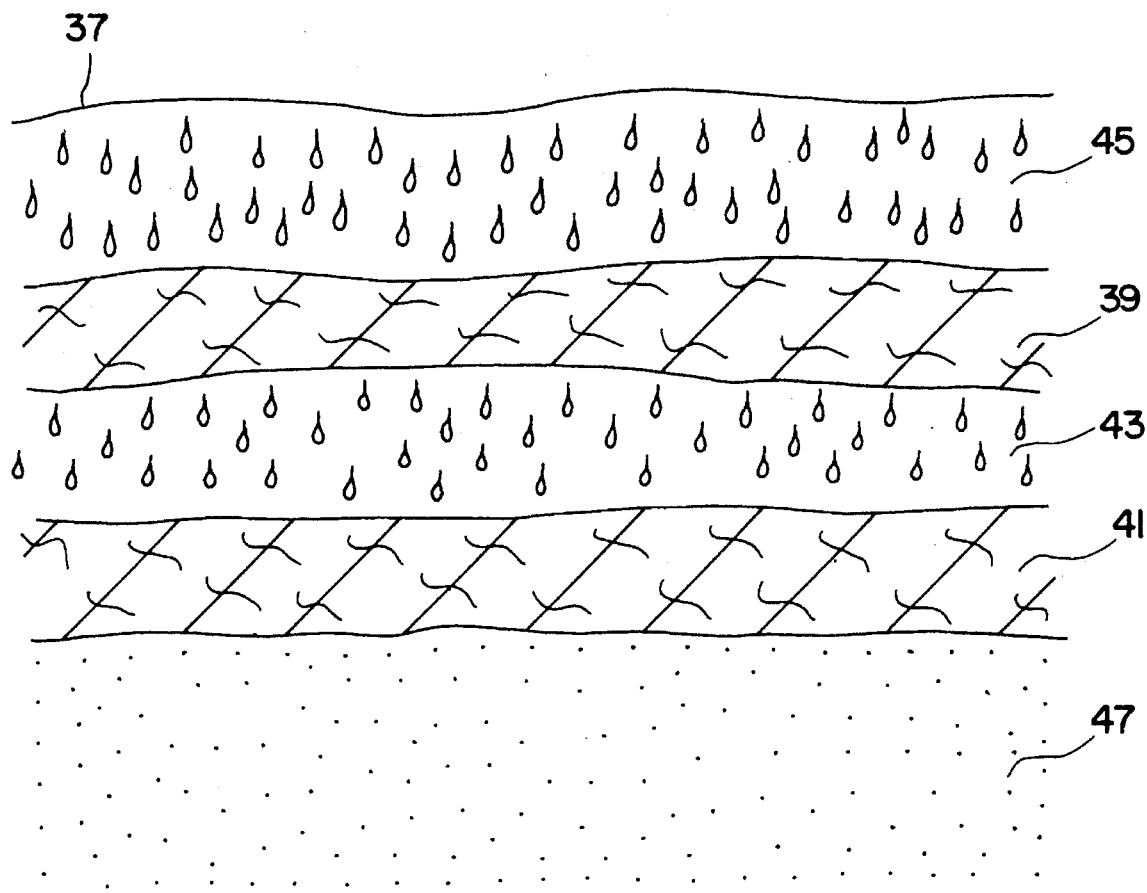
FIG. 6 is a cross-sectional view of an Artificial soil structure showing two hydrophobic layers in spaced relationship.

FIG. 6 shows an Artificial soil structure 37 having two hydrophobic layers 39 and 41, and water-retentive layer 43 between layers 39 and 41. A water-retentive layer 45 overlays both hydrophobic layers 39 and 41. A soil layer 47 is provided below hydrophobic layer 41. The hydrophobic layers 39 and 41 consist essentially of hydrophobic particles.

Figure 7:
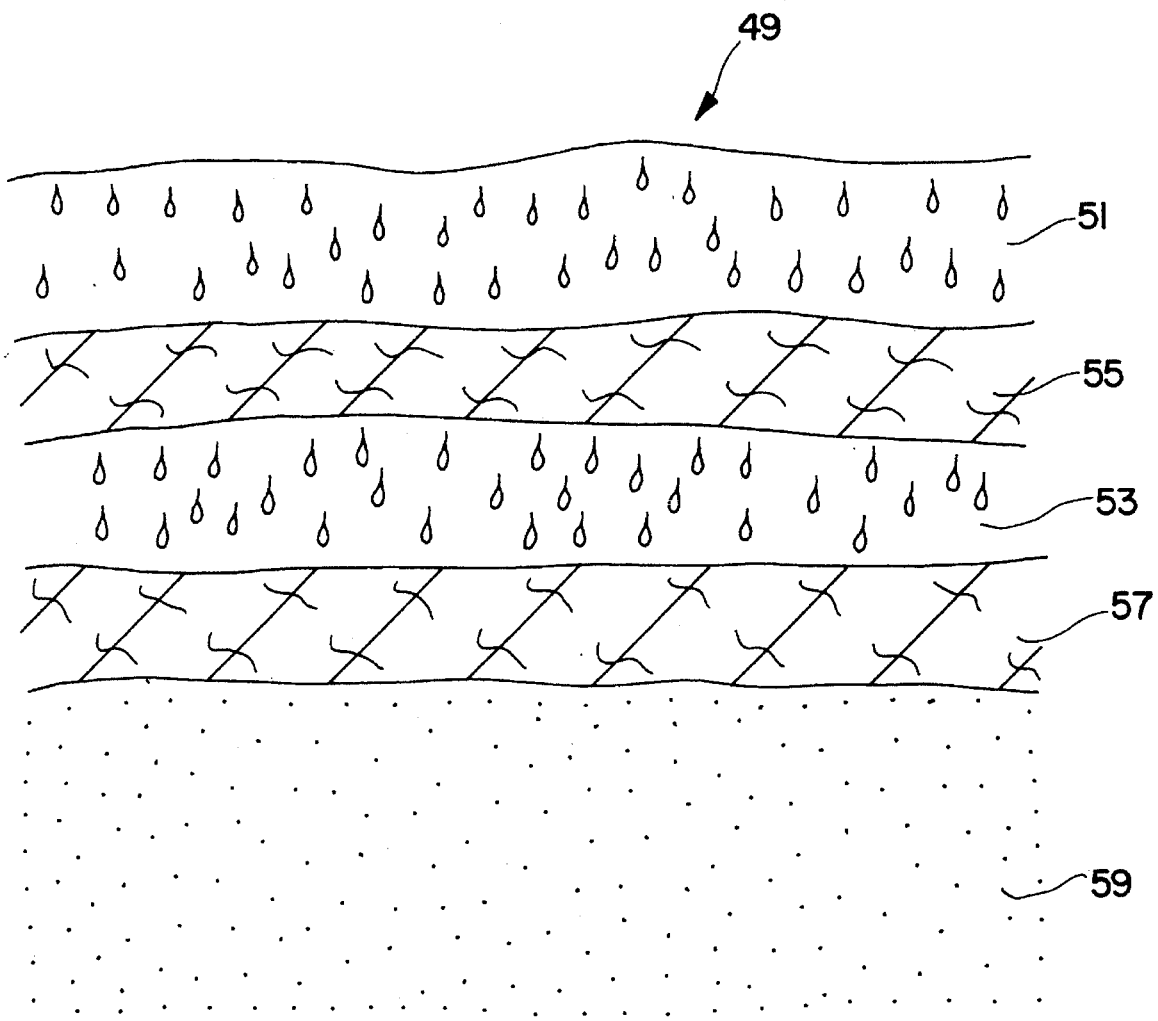
FIG. 7 is a cross-sectional view of an Artificial soil structure having two hydrophobic layers with different hydrophobicities.

FIG. 7 shows an Artificial soil structure 49 similar to FIG. 6, having water-retentive layers 51 and 53 and two shaped hydrophobic layers 55, 57 with different hydrophobicities. A layer of soil 59 underlies hydrophobic layer 57. Both hydrophobic layers consist essentially of hydrophobic particles.

Figure 8:
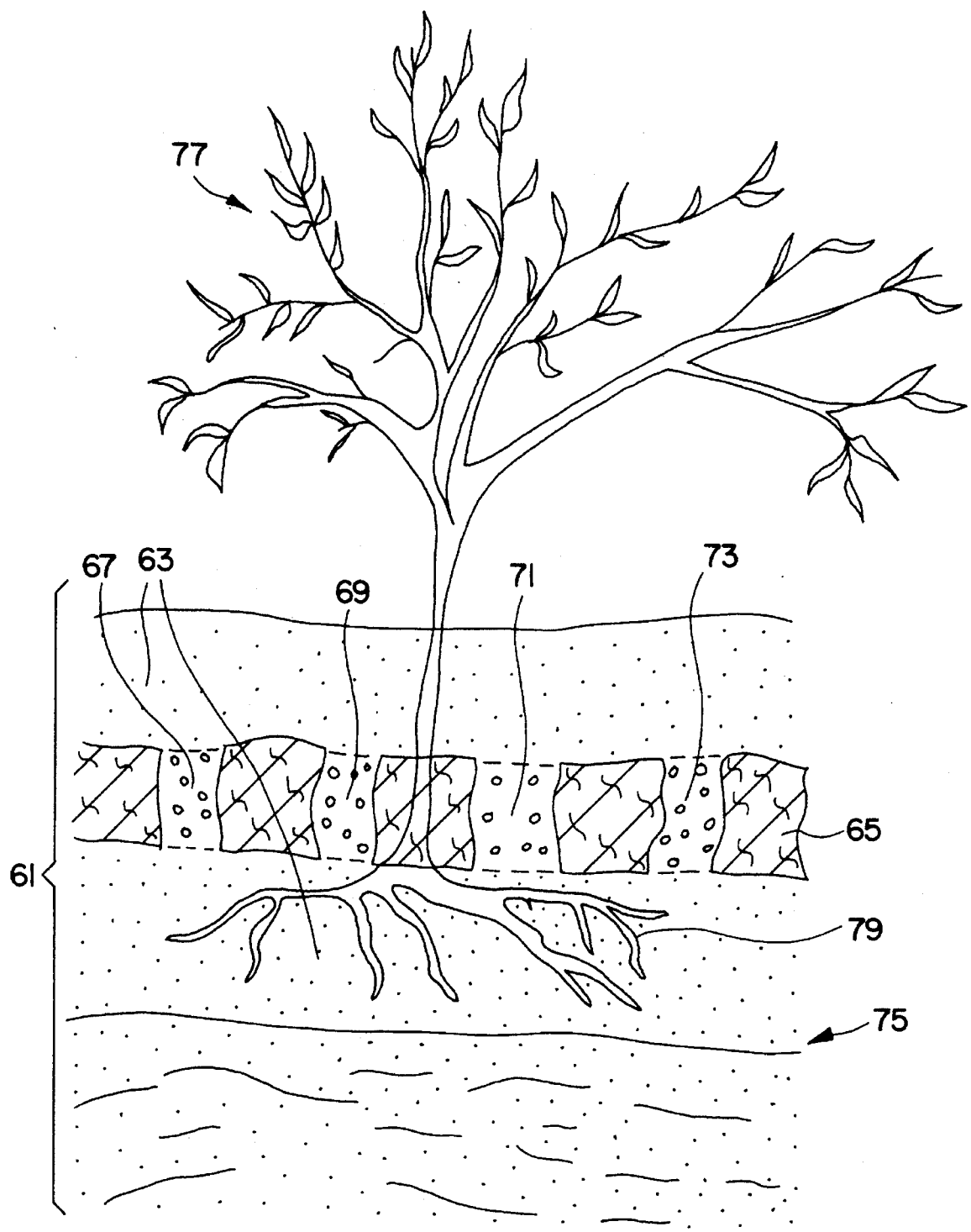
FIG. 8 is a cross-sectional view of an Artificial soil structure illustrating a non-hydrophobic soil portion within a hydrophobic layer to penetrate the hydrophobic layer.

FIG. 8 shows an Artificial water-retentive soil structure 61 having soil particle 63 both above and below a hydrophobic layer 65 consisting essentially of hydrophobic particles. The soil layers contain a water-retentive agent (not shown) above hydrophobic layer 65, and the hydrophobic layer 65 consists essentially of hydrophobic particles provided above or on the soil particles 63. Non-hydrophobic soil particles 67, 69, 71 and 73 are provided within hydrophobic layer 65, and actually penetrate (extend through) layer 65.

In FIG. 8, the ground-water level is represented by line 75, and plant 77 is shown with its roots 79 above groundwater level and below the hydrophobic layer 65.

Although the invention has been described with respect to specific embodiment for complete and clear disclosure, the appended claims are not to be thus limited but are to be construed as embodying all modification and alternative constructions that may occur to one skilled in the art which fairly fall within the basic teaching hereinset fourth.

What is claimed is:

1. An artificial water-retentive soil structure comprising:
   a soil block comprising soil particles; and
   at least one sand layer consisting of sand treated with fluoro-type water-repellant agent, wherein said sand layer is located in the soil above ground water level and below roots of a plant;
   said sand layer being located from about 40–80 cm below a top surface of the soil;
   sand in said sand layer having an average particle size of about 2,000 micrometers or less,
   said sand layer having a thickness of 1 to 5 cm.

2. An artificial water-retentive soil structure comprising:
   a soil block comprising soil particles, at least two hydrophobic layers consisting essentially of hydrophobic particles provided in said soil block, said hydrophobic layers being spaced from and out of contact with each other.

3. An artificial soil structure, according to claim 2; wherein said hydrophobic particles are sand and/or dirt treated with a water-repellent agent.

4. An artificial soil structure, according to claim 2; wherein said hydrophobic particles consist of a high molecular polymer.

5. An artificial water-retentive soil structure comprising:
   a soil block comprising soil particles, said soil block containing a water-retentive agent and a hydrophobic layer consisting essentially of hydrophobic particles provided above or on said soil block, a non-hydrophobic soil portion is provided within said hydrophobic layer to penetrate said hydrophobic layer.

6. An artificial water-retentive soil structure, according to claim 5; wherein said hydrophobic layer is located in the soil above a ground-water level and above or even with roots of a plant.

7. An artificial water-retentive soil structure, according to claim 5; wherein said hydrophobic layer is located from about 5 to 40 cm below a top surface of the soil.

8. An artificial water-retentive soil structure, according to claim 5; wherein said hydrophobic layer has a thickness of from about 3 to 5 times an average size of said hydrophobic particles in said hydrophobic layer.

9. An artificial water-retentive soil structure, according to claim 5; wherein said hydrophobic layer has a thickness of from about 1 to 5 cm.

10. An artificial water-retentive soil structure, according to claim 5; wherein a water-retentive layer of soil particles containing a water-retentive agent is provided above said hydrophobic layer.

11. An artificial water-retentive soil structure, according to claim 5; wherein said water-retentive agent is a polymer compound having water-retentivity.

12. An artificial water-retentive soil structure, according to claim 5; wherein the particle size of said hydrophobic particles is 2000 micrometers and less.

13. An artificial water-retentive soil structure, according to claim 5; wherein said hydrophobic particles are sand and/or dirt treated with a water-repellent agent.

14. An artificial water-retentive soil structure, according to claim 13; wherein said water-repellent agent is a silicone or fluoro type water-repellent agent.

15. An artificial soil structure comprising:

a soil block comprising soil particles, at least two hydrophobic layers consisting essentially of hydrophobic particles provided in said soil block, and said hydrophobic layers having different hydrophobicities.

\* \* \* \* \*